F. W. MYERS.
ANTISKID AND TRACTION DEVICE.
APPLICATION FILED JUNE 11, 1921.

1,425,037.

Patented Aug. 8, 1922.

INVENTOR:
F. W. MYERS
By Earl M. Sinclair
Atty.

UNITED STATES PATENT OFFICE.

FREDERICK W. MYERS, OF DES MOINES, IOWA, ASSIGNOR OF ONE-HALF TO F. E. PIEPER, OF DES MOINES, IOWA.

ANTISKID AND TRACTION DEVICE.

1,425,037.     Specification of Letters Patent.     Patented Aug. 8, 1922.

Application filed June 11, 1921. Serial No. 476,740.

*To all whom it may concern:*

Be it known that I, FREDERICK W. MYERS, a citizen of the United States of America, and resident of Des Moines, Polk County, Iowa, have invented a new and useful Antiskid and Traction Device, of which the following is a specification.

The object of this invention is to provide an improved traction and anti-skid device for tires of motor vehicles.

A further object of this invention is to provide an improved emergency traction and anti-skid device combining mud shoes and cross-chains connected in a group and capable of being readily and quickly applied to or removed from a wheel even when said wheel is in an unfavorable situation such as a mud hole.

A further object of this invention is to provide improved means for securing a traction and anti-skid device to a wheel.

With these and other objects in view, my invention consists in the construction, arrangement and combination of elements hereinafter set forth, pointed out in my claims and illustrated by the accompanying drawing, in which—

Figure 1:
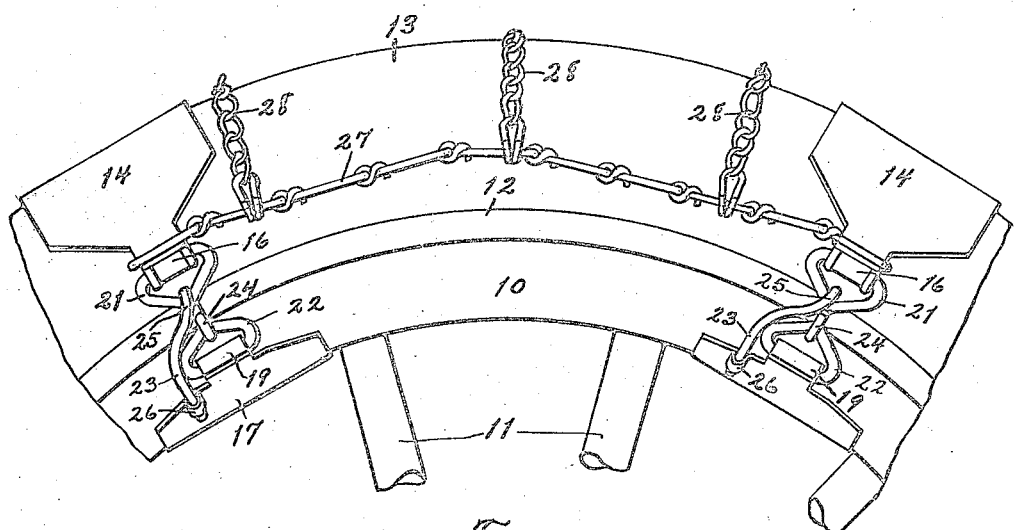
Figure 2:
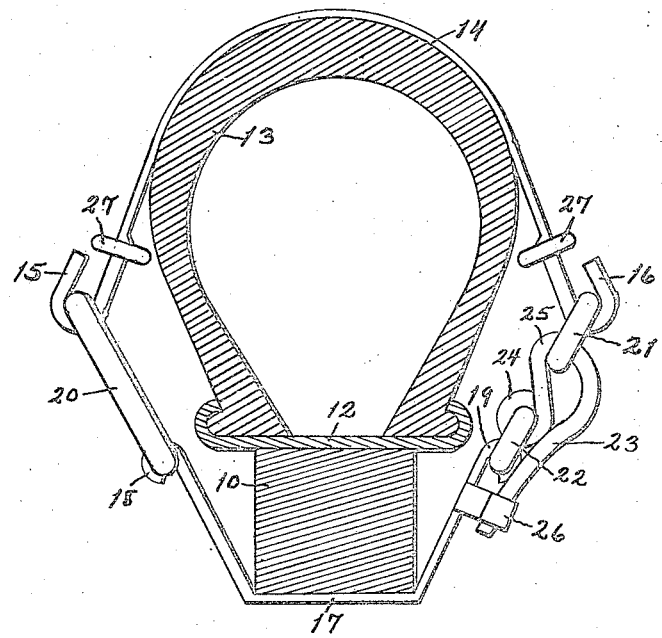

Figure 1 is a side elevation illustrating a portion of a vehicle wheel with a set of my improved devices applied thereto in position for practical use. Figure 2 is an end elevation of the device, a tire, rim and felloe being shown in section, Figure 2 being on an enlarged scale.

In the drawing, the numeral 10 designates a felloe, carried by spokes 11 and having thereon a metal rim 12 adapted to receive a pneumatic or other tire 13. Mud shoes 14 are provided, of similar construction, each being concavo-convex in cross-section and adapted to fit the tread surface and outer side portions of the tire 13, preferably fitting said tire closely to about the greatest transverse diameter thereof as shown in Figure 2. The shoes 14 are tapered at their ends and said tapered portions diverge away from the sides of the tire on substantially tangential planes and terminate in outwardly directed hooks 15, 16, or eyes. The mud shoes 14 may be of any suitable width and thickness to suit them for the purpose for which they are designed, and are made in different sizes for the different sizes of tires. Felloe plates 17 are provided, one for each mud shoe 14, and each of said plates is formed with a substantially straight and plane central portion adapted to fit and contact the radially inner surface of the felloe 10 and also formed with diverging wings on the respective ends of such straight portion, extending on opposite sides of and out of contact with the felloe and toward the side margins of the rim 12. The wings of the felloe plates are tapered or reduced in width at their outer ends and terminate in outwardly directed connecting hooks 18, 19, or eyes. The hook 15 of each mud shoe 14 is flexibly connected by a link 20 to the hook 18 of a felloe plate, thus completing the connection on one side of the tire, preferably that side toward the body of the vehicle. The wings of the felloe plate extend outwardly at angles of thirty to forty-five degrees relative to the planes of the sides of the felloe, and the link 20 preferably is substantially in the same plane as the corresponding wing, so that the pull on and between said members is at an angle to the plane of the wheel but such angle is not too great for security and efficiency. A triangular link 21 is pivoted on the hook 16 or eye at the opposite end of the mud shoe and a similar link 22 is pivoted on the corresponding hook 19 or eye of the felloe plate. A latching lever 23 is formed with an eye 24 at one end pivoted on the triangular link 22 of the felloe plate, and said lever is recurved between its ends to form a loop or bight 25 adapted to engage the triangular link 21 of the mud shoe. The triangular links 21, 22 are of isosceles form, each having its base pivoted on the hook or eye 16 or 19, and one angle engaged by the eye 24 or loop 25 of the latching lever. The latching lever 23 is offset laterally between its loop 25 and the end opposite to the eye 24, and such opposite end is relatively long, extending considerably past the location of the eye 24 and to one side thereof and adapted, when in latch position, to overlap upon the adjacent wing of a felloe plate 17. The said wing of the felloe plate is formed with an outstanding latching hook 26 beneath which the free end of the latching lever is adapted to be engaged, to hold said lever in its latching position. The offsetting of the lever 23 carries its free end to one side of the connecting hook 19 and link 22.

Two or more of the mud shoes 14 are mounted on a tire such as 13 in spaced relation and are flexibly connected to form a set, group or unit of my improved traction and anti-skid devices. The connection between the shoes is by means of sections of side chain 27, one on each side of the tire, end links of said sections engaging the reduced portions of the shoe or shanks of the hooks 15, 16, said hooks being sufficiently narrow to pass through the openings of said end links. The two sections of side chain 27 of each set or unit are connected by cross-chains 28 extending across the tread of the tire in a common manner, preferably one of said cross-chains adjacent each shoe 14 and one midway between them. The intermediate cross-chain 28 is drawn tightly across the tire but the end cross-chains are relatively loose and free to oscillate as the wheel revolves, thus playing back and forth on the tread of the tire and even overlapping at times upon the adjacent mud shoes 14. This prevents excessive wear on the tire and also on the traction devices, and prevents sudden jar and gripping of the devices on the tread surface as they engage in rotation of the wheel.

To secure the devices in place, the mud shoes are mounted on the tire, in their properly spaced relation, with the connecting side chains 27 taut, and the felloe plates 17 are carried across the felloe between spaced pairs of spokes 11. The fastening levers 23 of each are inserted through the links 21 and moved through arcs to the position shown, their free ends being engaged beneath and held by the hooks 26. As the devices are applied in groups, sets or units, they may be put on when the wheel is in a very unfavorable situation, such as a mud hole, and used to extricate the wheel from such position.

It may be found desirable at times, especially on large tires of trucks and the like, to use more than two of the mud shoes 14 in a group or set, one or more being connected to the side chains 27 between the end shoes.

As many of the groups or sets of devices may be applied to a given wheel as may be needed, and separately and independently attached thereto as described.

I claim as my invention:—

1. A traction and anti-skid device, comprising a curved mud shoe formed with hooks at its ends, a felloe plate having a plane central portion and wings diverging from the same and terminating in hooks, a link flexibly connecting a hook of said mud shoe to a hook of said felloe plate, a link pivoted on the other hook of said mud shoe, a link pivoted on the other hook of said felloe plate, and a latching lever pivoted on one of said links and adapted to engage the other, said lever being offset laterally between its ends to avoid said hooks.

2. A traction and anti-skid device, comprising a curved mud shoe formed with hooks at its ends, a felloe plate having hooks at its ends, a link flexibly connecting a hook of said mud shoe to a hook of said felloe plate, a triangular link pivoted on the other hook of said mud shoe, a triangular link pivoted on the other hook of said felloe plate, a latching lever pivoted on one of said triangular links and being recurved to form a loop adapted to engage the other of said triangular links, the free end portion of said lever being offset laterally so that the terminal end may move through an arc in a plane spaced from the hook of said felloe plate.

3. A traction and anti-skid device, comprising a curved mud shoe formed with hooks at its ends, a felloe plate having connecting hooks at its ends, a link pivotally connecting a hook of said mud shoe to a hook of said felloe plate, a triangular link pivoted on the other hook of said mud shoe, a triangular link pivoted on the other hook of said felloe plate, a latching lever pivoted on one of said triangular links and being recurved to form a loop adapted to engage the other, and a latching hook on said felloe plate at one side of the connecting hook thereon adapted to engage and hold the free end of said lever.

Signed at Des Moines, in the county of Polk and State of Iowa, this 9th day of June, 1921.

FREDERICK W. MYERS.